US012217592B2

(12) United States Patent
Lin et al.

(10) Patent No.: US 12,217,592 B2
(45) Date of Patent: Feb. 4, 2025

(54) APPLICATION OF ON-SITE EARTHQUAKE EARLY WARNING CLOUD INTEGRATION AND REGIONAL EARLY WARNING CROSS BACKUP

(71) Applicant: P-Waver Inc., Taipei (TW)

(72) Inventors: Pei-Yang Lin, Taipei (TW); Hsiu-Hsien Wang, Taipei (TW); Hung-Wei Chiang, Taipei (TW)

(73) Assignee: P-WAVER INC., Taipei (TW)

( * ) Notice: Subject to any disclaimer, the term of this patent is extended or adjusted under 35 U.S.C. 154(b) by 57 days.

(21) Appl. No.: 18/156,595

(22) Filed: Jan. 19, 2023

(65) Prior Publication Data

US 2024/0249610 A1 Jul. 25, 2024

(51) Int. Cl.
*G08B 21/10* (2006.01)
*G08B 27/00* (2006.01)

(52) U.S. Cl.
CPC ........... *G08B 21/10* (2013.01); *G08B 27/005* (2013.01)

(58) Field of Classification Search
CPC .............................. G08B 21/20; G08B 27/005
See application file for complete search history.

(56) References Cited

U.S. PATENT DOCUMENTS

| | | | | |
|---|---|---|---|---|
| 8,686,850 B2 * | 4/2014 | Zeng | G08B 21/10 | 340/539.1 |
| 11,714,207 B2 * | 8/2023 | Vancho | G01V 1/003 | 702/15 |
| 11,887,171 B2 * | 1/2024 | Bango | H04L 67/52 | |
| 2019/0033476 A1 * | 1/2019 | O'Malley | G06F 17/17 | |
| 2023/0314641 A1 * | 10/2023 | Chou | G01V 1/01 | 702/15 |

FOREIGN PATENT DOCUMENTS

| | | |
|---|---|---|
| TW | I447594 | 3/2013 |
| TW | I541770 | 7/2016 |
| TW | I622964 | 7/2016 |

* cited by examiner

*Primary Examiner* — John A Tweel, Jr.
(74) *Attorney, Agent, or Firm* — Michael W. Taylor; Wolter Van Dyke Davis, PLLC

(57) ABSTRACT

An information platform for providing an earthquake early warning of a large area is disclosed. The large area includes a plurality of small districts, different sets of the plurality of small districts form different large districts according to geographical locations so as to make up the large area, and the information platform is both connected with a plurality of on-site earthquake early warning stations and the plurality of small districts through a cloud network. The plurality of on-site earthquake early warning stations are located in the large districts respectively, each of the plurality of on-site earthquake early warning stations is configured to obtain a real-time seismic longitudinal wave measurement data, obtain a real-time seismic transverse wave feature prediction value corresponding to the real-time seismic longitudinal wave measurement data, and transmit the real-time seismic transverse wave feature prediction value.

20 Claims, 6 Drawing Sheets

200

APPLICATION OF ON-SITE EARTHQUAKE EARLY WARNING CLOUD INTEGRATION AND REGIONAL EARLY WARNING CROSS BACKUP

FIELD OF THE INVENTION

The present invention relates to a method and device for providing an earthquake early warning of a large area, in particular to a method and information platform for providing an earthquake early warning of a large area.

BACKGROUND OF THE INVENTION

Earthquakes cause different degrees of disasters in many areas, so the prediction technology of earthquakes is highly valued. Buildings or equipment located in areas with frequent seismic activities are often subject to damage and loss due to the earthquakes, particularly in the area close to the epicenter. Generally speaking, earthquake early warning technology can be divided into two categories: Regional seismic early warning technology and On-site seismic early warning technology. Using measurement data from multiple seismic stations located near the epicenter, the accuracy of seismic parameters predicted by regional earthquake early warning technology is usually higher than that of on-site seismic early warning technology. However, it allows a very limited time for the regional earthquake early warning system to pre-calculate the predicted seismic parameters before the destructive shock waves reach the peripheral area, making it difficult to let the personnel and equipment take immediate response and evacuate.

Since the velocity of the seismic primary wave or longitudinal wave is about 6-8 kilometers per second on the ground surface, and the velocity of the seismic shear wave or transverse wave is about half that of the longitudinal wave, it can be clearly observed there is a certain interval between the arrival time of the longitudinal wave and that of the transverse wave at a certain distance from the epicenter. For example, at a distance of about 10 kilometers from the epicenter, the time interval between the arrival of longitudinal waves and transverse waves is 3 seconds. If there is a device that can effectively estimate the magnitude of subsequent transverse waves based on the measurement data of longitudinal waves within this time period, there is an opportunity to take immediate safety measures to reduce the loss of equipment and personnel that may be caused due to the earthquake to a certain limit.

FIG. 1 shows a conventional system architecture 100 utilizing regional earthquake early warning techniques. As shown in the figure, a large area can be divided into several small blocks 101, 102, 103 . . . 111, 121, 131 and so on, and each small block is equipped with a set of seismic-related sensing devices 101A, 102A, 103A . . . 111A, 121A, 131A and etc., respectively connected to a host device 160 through the cloud network 150 to provide earthquake-related measurement data in real time. When an earthquake occurs, the host device 160 estimates to determine the magnitude of the earthquake and other parameters such as the seismic intensity of each small block based on the real-time seismic-relevant measurement data measured by the sensing devices 101A, 102A, 103A . . . 111A, 121A, 131A in each small block 101, 102, 103 . . . 111, 121, 131, and through the cloud network 150, the predicted seismic intensity related parameters are individually provided to the administrative unit or organization in each small block 101, 102, 103 . . . 111, 121, 131 for emergency reaction.

Such a system requires a large amount of real-time seismic-related measurement data transmitted by the cloud network 150, and the bandwidth and time occupied for the data transmission are considerably large, which is easily limited by the network transmission mechanism. In addition, if the local host device 160 cannot provide real-time calculation and transmission due to emergency factors such as earthquakes or power outages, such a system cannot provide an early warning function in real time.

The ROC patent I447594 provides an on-site earthquake disaster reduction and response control system and its method. The method pre-determines target apparatus for specific areas and selects one or more responding command and/or disaster-reducing command. The responding command and/or disaster-reducing command are output to the target apparatus at the predetermined area when the system receives on-site seismic early-warning information of an earthquake. The ROC patent I541770 provides an earthquake alarm broadcasting device and related methods, which are used to receive earthquake detection results, thereby judging whether an earthquake alarm needs to be issued and broadcast corresponding contingency measures to users. The ROC patent I622964 proposes an earthquake warning method and an earthquake warning broadcasting system to reduce the cost of the earthquake warning broadcasting system. Lacking of fundamental conditions for large-scale real-time communication, these systems and methods cannot simultaneously cover the real-time response operations of earthquake detection required in a large area, and it is even more difficult to take care of the pre-arranged backup response as required in the event of functional failure of some on-site earthquake early warning stations in a large area.

Therefore, it is necessary to avoid the above-mentioned shortcomings of the prior art, and to construct method and information platform for providing an earthquake early warning of a large area, which is a technical problem that needs to be solved.

SUMMARY OF THE INVENTION

The present invention provides a method and device for, which fully meets the needs of business requirements.

In accordance with one aspect of the present invention, an information platform for providing an earthquake early warning of a large area is provided, wherein the large area includes a plurality of small districts, different sets of the plurality of small districts form different large districts according to geographical locations so as to make up the large area, and the information platform is both connected with a plurality of on-site earthquake early warning stations and the plurality of small districts through a cloud network. The plurality of on-site earthquake early warning stations are located in the large districts respectively, each of the plurality of on-site earthquake early warning stations is configured to obtain a real-time seismic longitudinal wave measurement data, obtain a real-time seismic transverse wave feature prediction value corresponding to the real-time seismic longitudinal wave measurement data, and transmit the real-time seismic transverse wave feature prediction value. The information platform is configured to receive the plurality of real-time seismic transverse wave feature prediction values from the plurality of on-site earthquake early warning stations through the cloud network, and transmit the plurality of real-time seismic transverse wave feature prediction values to the plurality of small districts through the cloud network based on geographical locations of the plurality of small districts.

In accordance with another aspect of the present invention, an information platform for providing an earthquake early warning of a large area is provided, wherein the large area includes a plurality of small districts, a plurality of on-site earthquake early warning stations, and different sets of the plurality of small districts constitute different large districts respectively according to geological locations of the plurality of on-site earthquake early warning stations respectively so that each of the plurality of on-site earthquake early warning stations is disposed in one of the large districts, wherein each of the plurality of on-site earthquake early warning stations is configured to obtain a real-time seismic longitudinal wave measurement data, obtain and transmit a real-time seismic transverse wave feature prediction value based on the real-time seismic longitudinal wave measurement data, and the information platform is configured to: receive the plurality of real-time seismic transverse wave feature prediction values from the plurality of on-site earthquake early warning stations through a cloud network connecting to the plurality of on-site earthquake early warning stations and the plurality of small districts respectively; and transmit one of the plurality of real-time seismic transverse wave feature prediction values to the plurality of small districts through the cloud network.

In accordance with a further aspect of the present invention, a method for providing an earthquake early warning of a large area is provided, wherein the large area includes a plurality of large districts and a plurality of small districts, comprising the following steps of: (A) providing a plurality of on-site earthquake early warning stations separately disposed in the plurality of large districts; (B) allocating different sets of the plurality of small districts into different large districts respectively according to geological locations of the plurality of on-site earthquake early warning stations respectively so that each of the plurality of on-site earthquake early warning stations is disposed in one of the large districts; (C) providing an information platform connected to the plurality of on-site earthquake early warning stations and the plurality of small districts through a cloud network; (D) for each of the large districts, obtaining a real-time seismic transverse wave feature prediction value corresponding to an on-site seismic longitudinal wave measurement data relevant to the large district via at least one of the plurality of on-site earthquake early warning stations; and (E) causing the information platform to receive at least one of the plurality of real-time seismic transverse wave feature prediction values from the plurality of on-site earthquake early warning stations through the cloud network, and transmitting the at least one of the plurality of real-time seismic transverse wave feature prediction values to the plurality of small districts through the cloud network based on a predetermined allocation.

The method and device for providing an earthquake early warning of a large area may effectively reduce cost and damages due to earthquakes. It can be used to achieve at least one of the following purposes: used in areas where earthquakes may occur, to reduce disasters caused by earthquakes with real-time early warning, with industrial applicability; to ensure the stability and reliability of alarm transmission; and through the platform to provide early warning information for the security industry, telecommunications industry, fire protection IOT industry, and all regions, so that these companies can use this information and their existing systems and communications to provide their customers with value-added earthquake early warning and disaster prevention and control services. Thus, the present invention has utility for industry.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
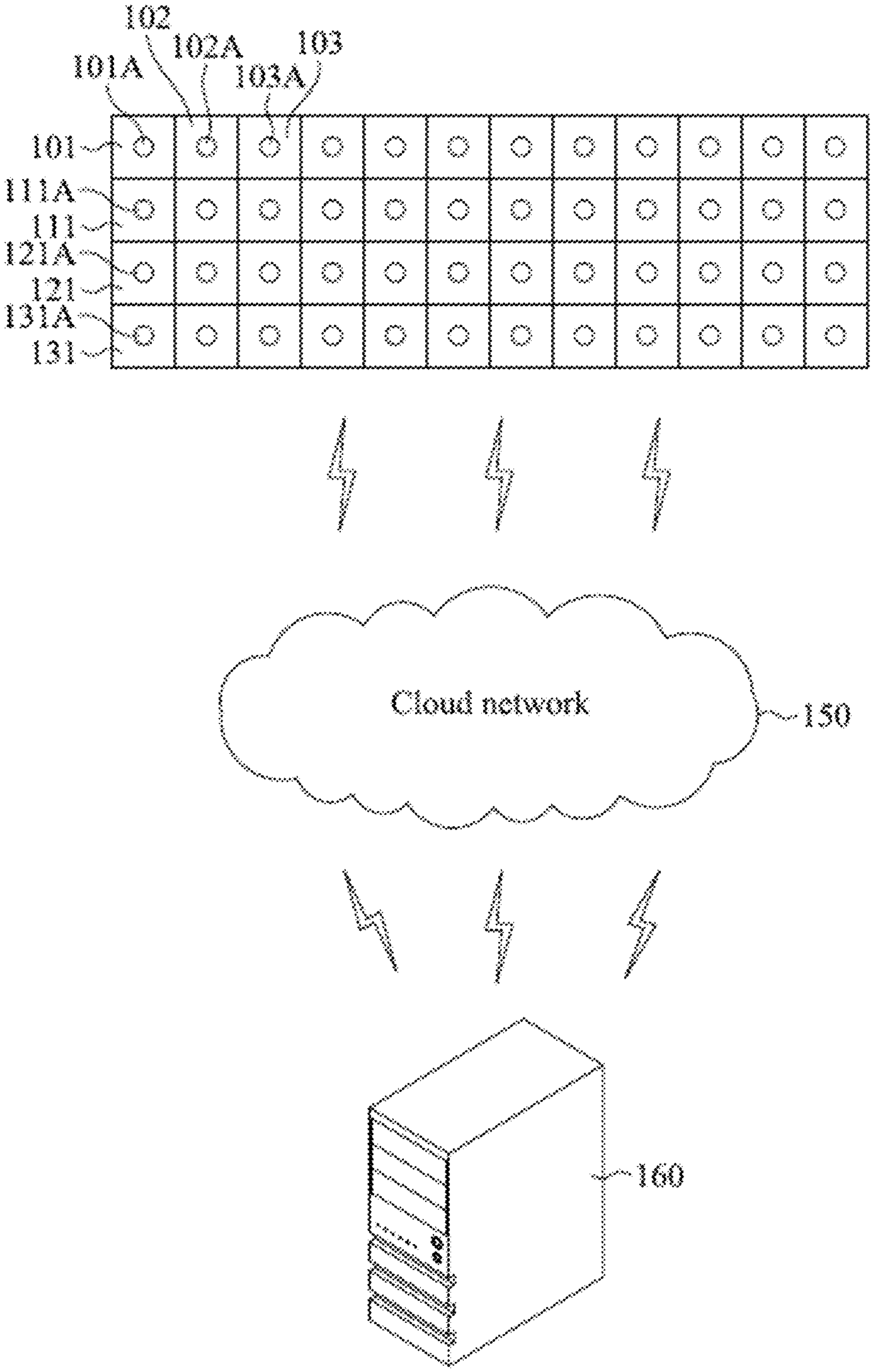
Fig. 1 (Prior Art)
FIG. 1 is a schematic diagram showing a conventional system architecture utilizing regional earthquake early warning techniques.
Figure 2A:
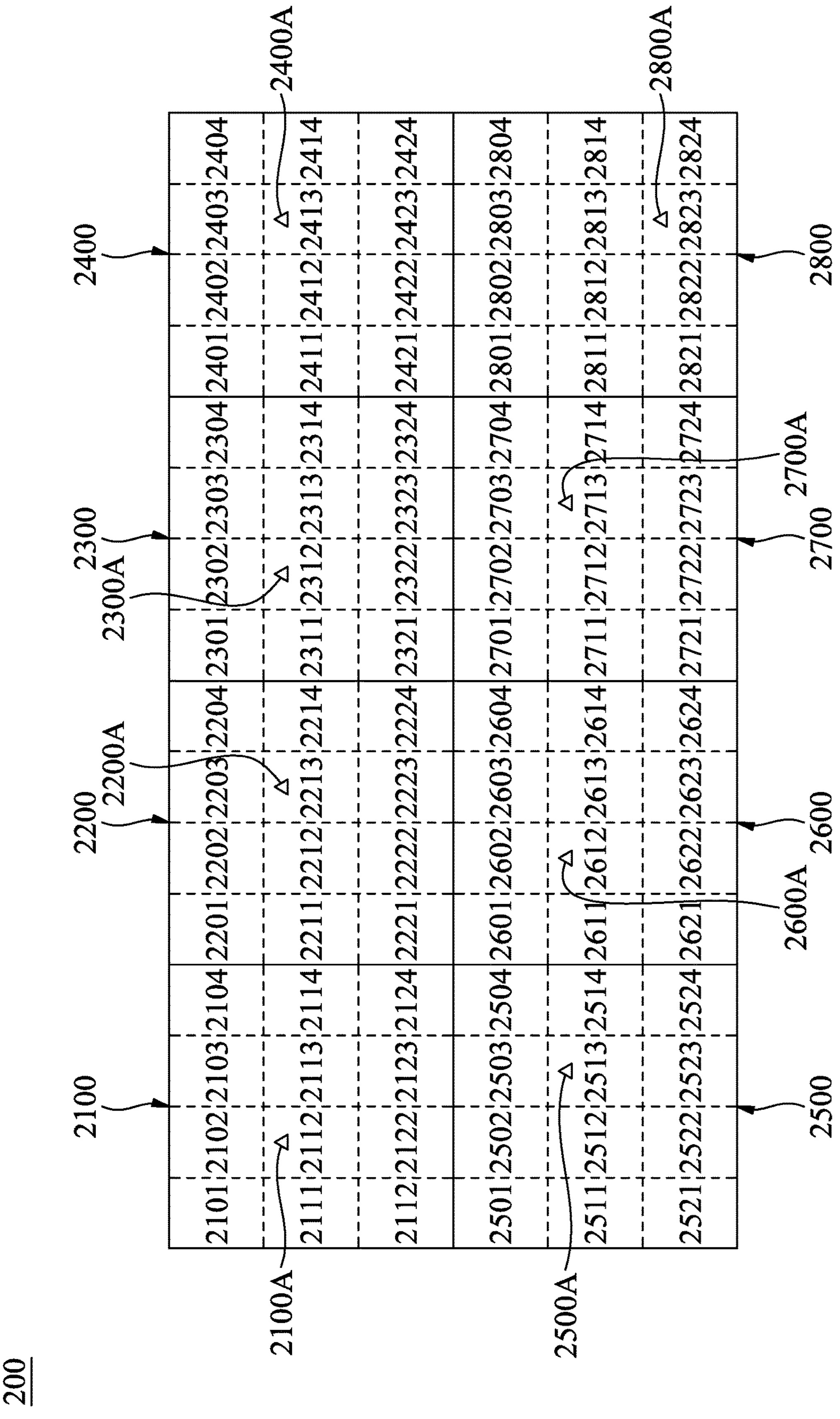
FIG. 2A is a schematic diagram showing a large area including a plurality of small districts.
Figure 2B:
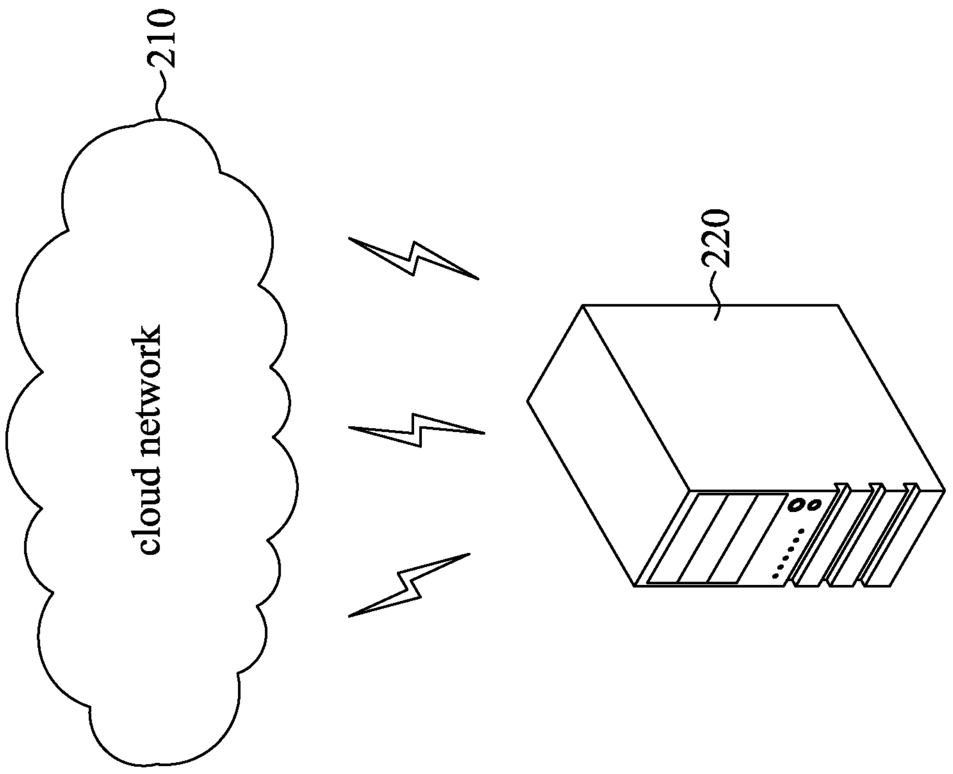
FIG. 2B is a schematic diagram showing a concept for providing earthquake early warning information to the large area as illustrated in FIG. 2A, according to one embodiment of the present invention.

Please refer to FIGS. 2A and 2B, which shows a method for providing earthquake early warning information to the large area, according to one embodiment of the present invention. In FIG. 2A, for the sake of introduction, the target large area 200 can include, but should not be limited to, a plurality of small districts 2101, 2102, 2103 . . . 2823, 2824 and etc. According to one embodiment of the present invention, different sets of the plurality of small districts 2101, 2102, 2103 . . . 2823, 2824 form different large districts 2100, 2200 . . . 2800 according to geographical locations, so as to make up the large area 200. In one embodiment, the large area 200 can be a metropolitan area such as Taipei city. For example, the 12 small districts 2101, 2102, 2103, 2104, 2111, 2112, 2113, 2114, 2121, 2122, 2123, 2124 located at the upper left corner of FIG. 2A can form the large district 2100, and the other large districts 2200, 2300 . . . 2800 can be formed in the same manner. In FIG. 2A, there are 96 small districts 2101, 2102, 2103 . . . 2823, 2824 forming 8 large districts 2100, 2200 . . . 2800 according to geographical locations. The skilled person in the art can also arrange plural local small districts into several large districts based on the local geographical structure of metropolitan such as New York or Tokyo. In some embodiments, the large area 200 may also be an island or even a portion or the whole region of a country.

Please simultaneously refer to FIGS. 2A and 2B. According to one embodiment of the present invention, a plurality of on-site earthquake early warning stations 2100A, 2200A . . . 2800A are disposed in the large districts 2100, 2200 . . . 2800 respectively. The plurality of on-site earthquake early warning stations 2100A, 2200A . . . 2800A are configured to obtain a real-time seismic longitudinal wave measurement data, obtain a real-time seismic transverse wave feature prediction value corresponding to the real-time seismic longitudinal wave measurement data, and transmit the real-time seismic transverse wave feature prediction value. The real-time seismic longitudinal wave measurement data includes acceleration, velocity and etc. Taking the on-site earthquake early warning station 2100A as an example, it can calculate to obtain the real-time seismic transverse wave feature prediction value, such as the maximum surface acceleration value, the maximum surface velocity value or the seismic intensity level, based on the data such as the acceleration and the velocity measured at the large districts 2100.

Different countries in the world have different classification methods for earthquake magnitudes, basically the maximum surface acceleration value, the maximum surface velocity value data or the seismic intensity value (for example, Taiwan uses the seismic intensity level) is adopted to estimate the magnitude of the earthquake intensity. Those skilled in the art can adapt it to local conditions.

From a different point of view, referring to FIG. 2A and according to one embodiment of the present invention, a plurality of on-site earthquake early warning stations 2100A, 2200A . . . 2800A are disposed in the large area 200, and different sets of the 96 small districts 2101, 2102, 2103 . . . 2823, 2824 are arranged to form different large districts 2100, 2200 . . . 2800 respectively, so that each of the plurality of on-site earthquake early warning stations 2100A, 2200A . . . 2800A is disposed in one of the large districts 2100, 2200 . . . 2800. That is to say, the number or scopes of the large districts 2100, 2200 . . . 2800 may be changed if the number or positions of the small districts 2101, 2102, 2103 . . . 2823, 2824 change.

In one embodiment of the present invention, the information platform 220 for processing the information of earthquake early warning is both connected with the plurality of on-site earthquake early warning stations 2100A, 2200A . . . 2800A and the plurality of small districts 2101, 2102, 2103 . . . 2823, 2824 through a cloud network 210. Since the on-site earthquake early warning stations 2100A . . . 2800A synchronize as well as process the seismic longitudinal wave measurement data in real time and send the real-time seismic transverse wave prediction feature values, the information platform 220 can instantly receive these real-time seismic transverse wave prediction feature values via the cloud network 210 when an earthquake occurs. According to an embodiment, platform 220 may send the real-time prediction feature values of seismic transverse wave to the small districts 2101, 2102, 2103 . . . 2823, 2824 through the cloud network 210 according to the geographic locations of each of the small districts in the large area 200 shown in FIG. 2A by the local earthquake early warning station of the large district to which the small district belongs, so that the institutions in each district 2101, 2102, 2103 . . . 2823, 2824 can timely take actions.

It can be appreciated from the illustration of FIG. 2A, locations of the on-site earthquake early warning stations 2100A . . . 2800A can be allocated at anywhere in the large districts 2100, 2200 . . . 2800 respectively, due to terrain or environmental factors. For example, the on-site earthquake early warning station 2200A is located in the small district 2213 near the center of the large district 2200, while the on-site earthquake early warning station 2800A is located in the small district 2823 near the edge of the large district 2800. No matter where the relative position of the on-site earthquake early warning stations 2100A, 2200A . . . 2800A is located in the large districts 2100, 2200 . . . 2800, through the assistance of wired or wireless communication, the real-time seismic P-wave measurement data (such as the acceleration, velocity, etc. of the P-wave) obtained from multiple different locations in the large districts can be used to estimate the real-time seismic transverse wave prediction feature values (such as the maximum acceleration on the ground surface, the maximum surface speed of the transverse wave, seismic intensity level, and etc.) of the district.

Those skilled in the art can understand that, since the embodiments of the present invention utilize the on-site earthquake early warning system to estimate the seismic intensity, the real-time prediction of feature values of the seismic transverse waves obtained by the on-site earthquake early warning stations 2100A, 2200A . . . 2800A are suitable for the earthquake early warning for the need of the large districts 2100, 2200 . . . 2800 where they are located respectively and the small districts nearby. Therefore, according to an embodiment of the present invention, the information platform 220 can select and send suitable real-time seismic transverse wave prediction feature values to each district 2101, 2102, 2103 . . . 2823, 2824 according to the geographic location. In other words, the real-time seismic transverse wave feature prediction value received by one of the plurality of small districts 2101, 2102, 2103 . . . 2823, 2824 through the cloud network 210 are derived from the on-site earthquake early warning station located in the same large district station, or the real-time seismic transverse wave feature prediction value received by one of the plurality of districts 2101, 2102, 2103 . . . 2823, 2824 through the cloud network 210 is derived from the local earthquake early warning station located in the adjacent large district. For example, the small district 2201 located in the large district 2200 can receive the real-time seismic transverse wave feature prediction value from the on-site earthquake early warning station 2200A sent by the information platform 220 through the cloud network 210. At the time of the occurrence of an earthquake, if the on-site earthquake early warning station 2200A was in a maintenance state or even failed and thus could not provide the real-time seismic transverse wave feature prediction value, the information platform 220 may choose to provide the district 2201 with the real-time seismic transverse wave feature prediction value originated from the earthquake early warning station 2100A in the large district 2100.

Based on the above, under the arrangement of the information platform 220, the embodiment of the present invention provides an innovative concept of cloud integration of on-site earthquake early warning and cross backup of regional early warning, so that all the small districts 2101, 2102 . . . 2823, 2824 in the large area 200 can instantly and effectively obtain the predicted real-time seismic transverse wave feature prediction value when an earthquake occurs, so as to quickly implement the contingency plan.

Figure 3A:
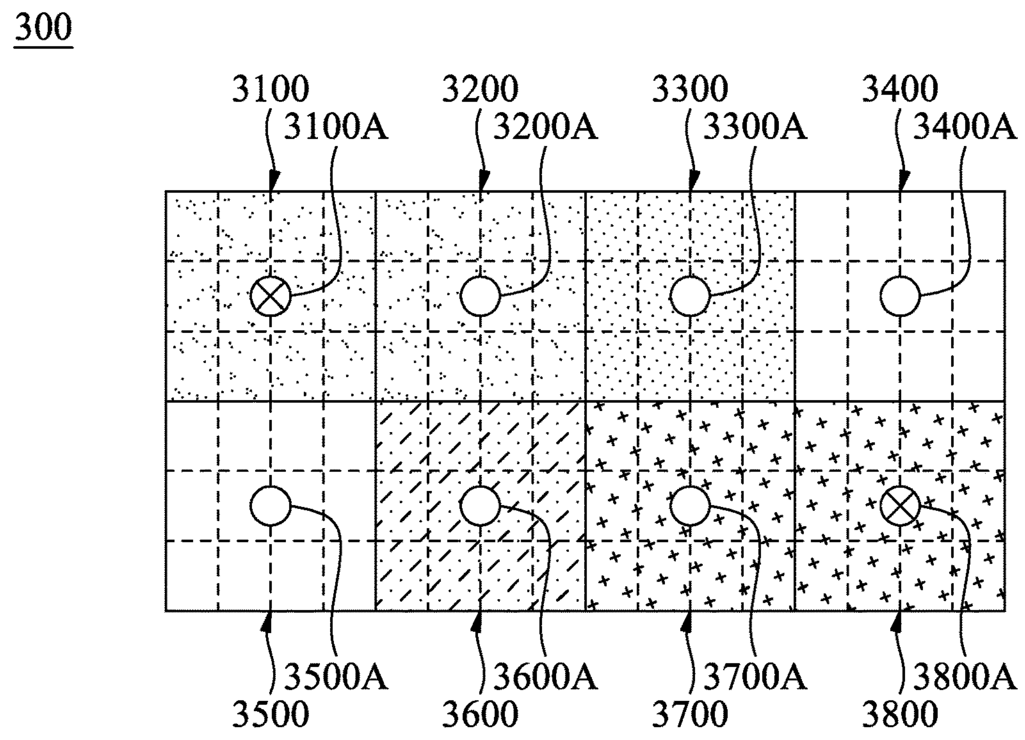
FIGS. 3A-3C are a schematic diagrams showing some pre-determined allocations for providing earthquake early warning information to a large area, according to embodiments of the present invention.
Figure 3B:
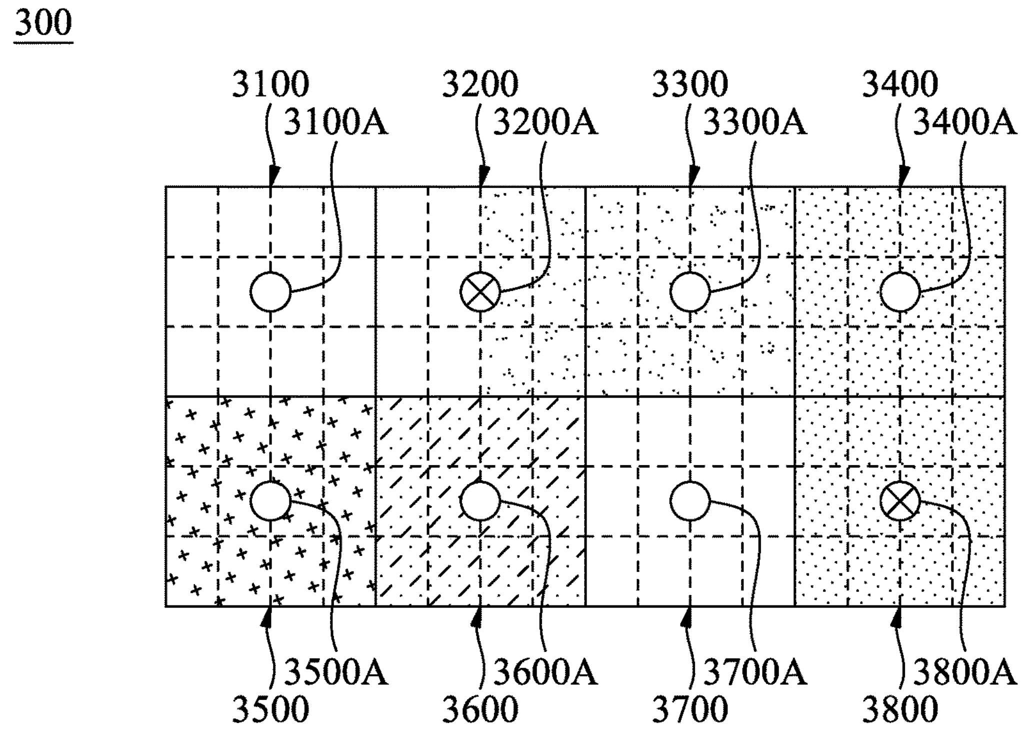
Figure 3C:
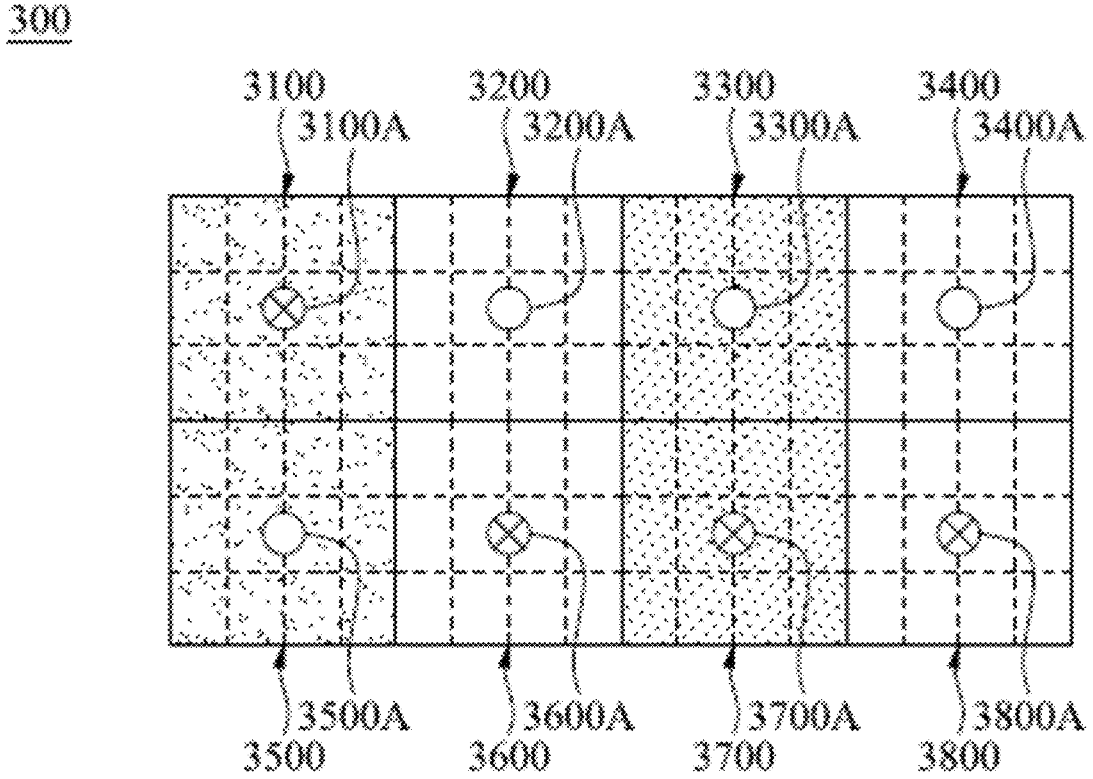

The interval between seismic longitudinal waves and transverse waves is usually only within a few seconds, so many information allocations that need to be analyzed and planned can be arranged in advance. FIGS. 3A-3C show some concepts according to embodiments of the present invention. The information platform 220 in FIGS. 2A and 2B is connected to the on-site earthquake early warning stations 3100A, 3200A . . . 3700A, 3800A of the large districts 3100, 3200 . . . 3700, 3800 in the large area 300 and all the small districts through the cloud network 210, respectively. When some of the on-site earthquake early warning stations 3100A, 3200A . . . 3700A, 3800A fail, some feasible examples of cross-backup of early warning in each districts are applicable. The skilled person in the art can apply the information sharing model provided by these examples, and arrange various other possible combinations.

Referring to FIG. 3A, when two on-site earthquake early warning stations 3100A, 3800A in the 8 large districts 3100, 3200 . . . 3700, 3800 fail, the information platform 220 can choose to send the real-time seismic transverse wave feature prediction values originated from the on-site earthquake early warning stations 3200A, 3700A in the adjacent large districts 3200, 3700 to the small districts in the large districts 3100, 3800. Since the vibration intensities in the adjacent areas are similar, the small districts in the large districts 3100 can use the seismic transverse wave feature prediction values sent by the on-site earthquake early warning station 3200A to infer the magnitude of the earthquake. Similarly, each small district in the large district 3700, 3800 can share the predicted transverse wave feature values sent by the on-site earthquake early warning station 3700A to infer the magnitude of the earthquake.

FIG. 3B shows that when the two on-site earthquake early warning stations 3200A, 3800A in the 8 large districts 3100, 3200 . . . 3700, 3800 fail, due to the fact that the local earthquake early warning stations 3100A, 3300A in the large district 3100, 3300 on the left and right sides of the large district 3200 have not failed, so the information platform 220 can choose to send the seismic transverse wave feature prediction values from the nearby local earthquake early warning stations 3100A, 3300A to the small districts on the left and the right portions in the large division 3200 respectively. In addition, the figure shows that the small districts in the large districts 3400,3800 can share the predicted transverse wave feature values sent by the on-site earthquake early warning station 3400A to infer the magnitude of the earthquake.

FIG. 3C shows that when the 4 on-site earthquake early warning stations 3100A, 3600A, 3700A, 3800A in the 8 large districts 3100, 3200 . . . 3700, 3800 fail, due to the fact that the on-site earthquake early warning stations 3200A . . . 3500A in their adjacent large districts 3200 . . . 3500 have not failed, so the information platform 220 can choose to send the seismic transverse wave feature prediction values from the nearby local earthquake early warning stations 3200A . . . 3500A to the small districts in each of the large sub-areas 3100, 3600, 3700, 3800 respectively.

Figure 4:
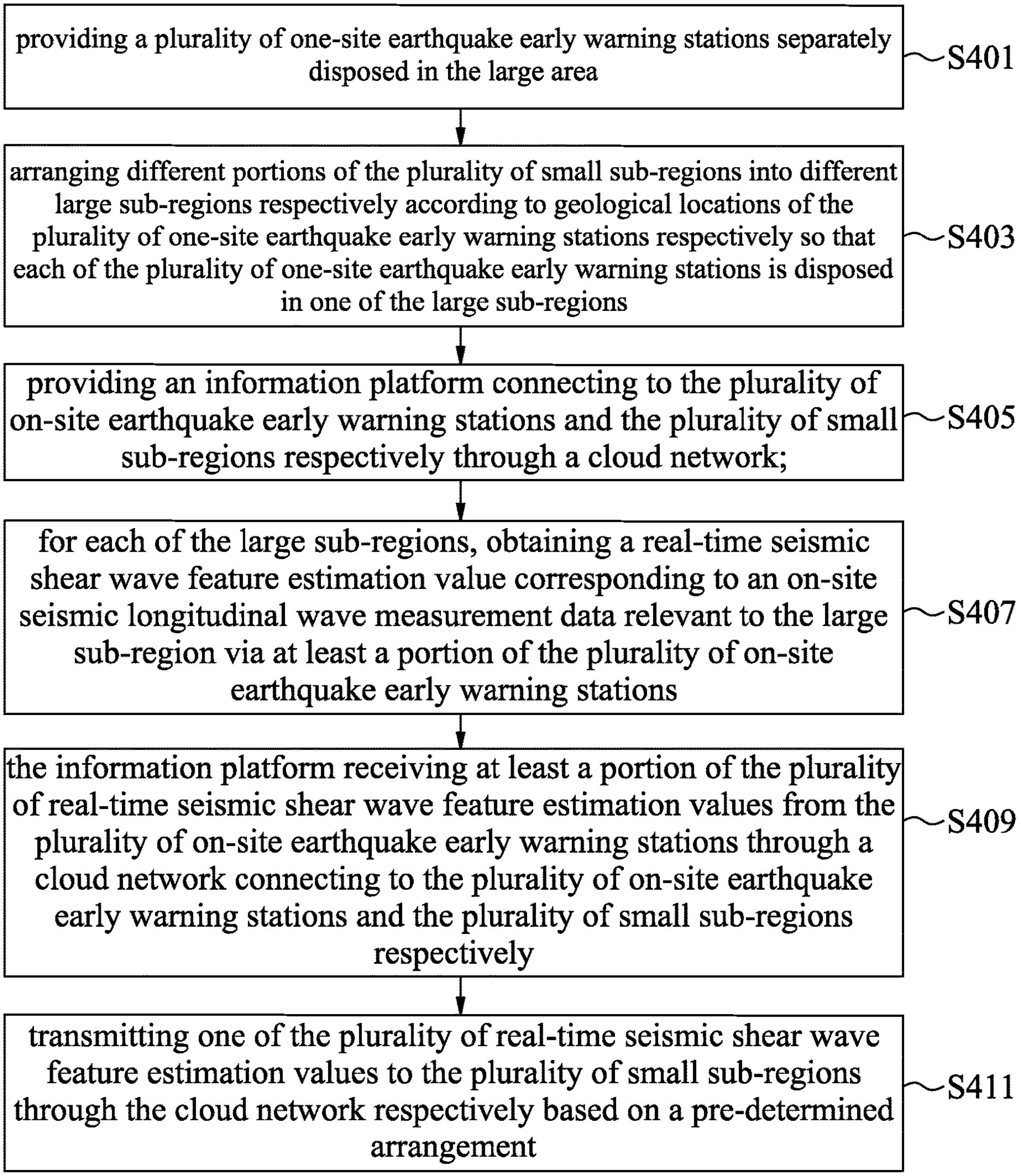
FIG. 4 is a schematic flowchart of an embodiment of providing earthquake early warning information to a large area according to the present invention.

FIG. 4 shows a schematic flowchart of an embodiment of the method of providing earthquake early warning information to a large area according to the present invention, the method includes the following steps: providing a plurality of on-site earthquake early warning stations separately disposed in the large area (Step S401); arranging different portions of the plurality of small districts into different large districts respectively according to geological locations of the plurality of on-site earthquake early warning stations respectively so that each of the plurality of on-site earthquake early warning stations is disposed in one of the large districts (Step S403); providing an information platform connecting to the plurality of on-site earthquake early warning stations and the plurality of small districts respectively through a cloud network (Step S405); for each of the large districts, obtaining a real-time seismic transverse wave feature prediction value corresponding to an on-site seismic longitudinal wave measurement data relevant to the large district via at least a portion of the plurality of on-site earthquake early warning stations (Step S407); the information platform receiving at least a portion of the plurality of real-time seismic transverse wave feature prediction values from the plurality of on-site earthquake early warning stations through a cloud network connecting to the plurality of on-site earthquake early warning stations and the plurality of small districts respectively (Step S409); and transmitting one of the plurality of real-time seismic transverse wave feature prediction values to the plurality of small districts through the cloud network respectively based on a pre-determined arrangement (Step S411).

In one embodiment of the present invention, the method of providing earthquake early warning information to a large area further including the following steps: continually monitoring the plurality of on-site earthquake early warning stations; and when the on-site earthquake early warning station in a first one of the large districts fails, the information platform is configured to select a respective real-time seismic transverse wave feature prediction value of a second one of the large districts near the first one of the large districts and transmit the respective real-time seismic transverse wave feature prediction values from the on-site earthquake early warning station in the second one of the large districts to the small districts located in the first one of the large districts through the cloud network.

The pre-determined allocation methods shown in FIGS. 3A-3C are only some examples thereof. In practice, the corresponding information allocation methods can be preset according to various possible situations and geographical location relationships. Since these allocation methods are properly arranged in advance, the information platform can send earthquake information to organizations or units in each small area within a very short period of time, without causing time delays.

The embodiment of the present invention provides an innovative concept of on-site earthquake early warning cloud integration and regional early warning cross backup, so that each small regions in a large area can instantly and effectively obtain the predicted feature values of seismic transverse waves based on the obtained real-time P-wave measurement data from the local earthquake early warning stations when an earthquake occurs, and the contingency plan can be quickly implemented. The data transmitted to the cloud network is only simple data sent by the on-site earthquake early warning station, which will not cost a burden on network transmission at all, and is used to integrate the on-site earthquake early warning on the cloud and regional early warning in an instant and effective way as well as cross-backup to provide earthquake warnings for a large area. The information platform also does not need to perform additional operations, so the concept of the embodiment of the present invention is completely suitable for emergency response, and can ensure the stability and reliability of alarm transmission. Through the platform mechanism, it can also provide early warning information for the security industry, the telecommunications industry, the IOT industry in the fire protection industry and all regions, so that these industries can use this information to provide their customers with value-added earthquake early warning services and disaster prevention through their existing systems and communications.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An information platform for providing an earthquake early warning of a large area, wherein the large area includes a plurality of small districts, different sets of the plurality of small districts form different large districts according to geographical locations so as to make up the large area, and the information platform is both connected with a plurality of on-site earthquake early warning stations and the plurality of small districts through a cloud network, wherein:

the plurality of on-site earthquake early warning stations are located in the large districts respectively, each of the plurality of on-site earthquake early warning stations is configured to obtain a real-time seismic longitudinal wave measurement data, obtain a real-time seismic transverse wave feature prediction value corresponding to the real-time seismic longitudinal wave measurement data, and transmit the real-time seismic transverse wave feature prediction value; and the information platform is configured to receive the plurality of real-time seismic transverse wave feature prediction values from the plurality of on-site earthquake early warning stations through the cloud network, and transmit the plurality of real-time seismic transverse wave feature prediction values to the plurality of small districts through the cloud network based on geographical locations of the plurality of small districts.

2. The information platform according to claim 1, wherein when the on-site earthquake early warning station in a first one of the large districts fails, the information platform is configured to select a respective real-time seismic transverse wave feature prediction value of a second one of the large districts near the first one of the large districts and transmit the respective real-time seismic transverse wave feature prediction value from the on-site earthquake early warning station in the second one of the large districts to all the small districts located in the first one of the large districts through the cloud network.

3. The information platform according to claim 1, wherein each of the real-time seismic transverse wave feature prediction values includes a maximum surface acceleration value.

4. The information platform according to claim 1, wherein each of the real-time seismic transverse wave feature prediction values includes a maximum surface speed value.

5. The information platform according to claim 1, wherein each of the real-time seismic transverse wave feature prediction values includes an intensity level.

6. The information platform according to claim 1, wherein the real-time seismic transverse wave feature prediction values received by one of the plurality of small districts through the cloud network are originally obtained by the on-site earthquake early warning station located in the same large district.

7. The information platform according to claim 1, wherein the real-time seismic transverse wave feature prediction values received by one of the small districts through the cloud network are originally obtained by the on-site earthquake early warning station located in the large district near the large district where the one of the small districts is located.

8. An information platform for providing an earthquake early warning of a large area, wherein the large area includes a plurality of small districts, a plurality of on-site earthquake early warning stations, and different sets of the plurality of small districts constitute different large districts respectively according to geological locations of the plurality of on-site earthquake early warning stations respectively so that each of the plurality of on-site earthquake early warning stations is disposed in one of the large districts, wherein each of the plurality of on-site earthquake early warning stations is configured to obtain a real-time seismic longitudinal wave measurement data, obtain and transmit a real-time seismic transverse wave feature prediction value based on the real-time seismic longitudinal wave measurement data, and the information platform is configured to:

receive the plurality of real-time seismic transverse wave feature prediction values from the plurality of on-site earthquake early warning stations through a cloud network connecting to the plurality of on-site earthquake early warning stations and the plurality of small districts respectively; and transmit one of the plurality of real-time seismic transverse wave feature prediction values to the plurality of small districts through the cloud network.

9. The information platform according to claim 8, wherein the real-time seismic transverse wave feature prediction values received by one of the plurality of small districts through the cloud network are originally obtained by the on-site earthquake early warning station located in the same large district.

10. The information platform according to claim 8, wherein the real-time seismic transverse wave feature prediction values received by one of the small districts through the cloud network are originally obtained by the on-site earthquake early warning station located in the large district near the large district where the one of the small districts is located.

11. The information platform according to claim 8, wherein each of the real-time seismic transverse wave feature prediction values includes a maximum surface acceleration value.

12. The information platform according to claim 8, wherein each of the real-time seismic transverse wave feature prediction values includes a maximum surface speed value.

13. The information platform according to claim 8, wherein each of the real-time seismic transverse wave feature prediction values includes an intensity level.

14. The information platform according to claim 8, wherein when the on-site earthquake early warning station in a first one of the large districts fails, the information platform is configured to select a respective real-time seismic transverse wave feature prediction value of a second one of the large districts near the first one of the large districts and transmit the respective real-time seismic transverse wave feature prediction value from the on-site earthquake early warning station in the second one of the large districts to the small districts located in the first one of the large districts through the cloud network.

15. A method for providing an earthquake early warning of a large area, wherein the large area includes a plurality of large districts and a plurality of small districts, comprising the following steps of:

providing a plurality of on-site earthquake early warning stations separately disposed in the plurality of large districts;

allocating different sets of the plurality of small districts into different large districts respectively according to geological locations of the plurality of on-site earthquake early warning stations respectively so that each of the plurality of on-site earthquake early warning stations is disposed in one of the large districts;

providing an information platform connected to the plurality of on-site earthquake early warning stations and the plurality of small districts through a cloud network;

for each of the large districts, obtaining a real-time seismic transverse wave feature prediction value corresponding to an on-site seismic longitudinal wave measurement data relevant to the large district via at least one of the plurality of on-site earthquake early warning stations; and causing the information platform to receive at least one of the plurality of real-time seismic transverse wave feature prediction values from the plurality of on-site earthquake early warning stations through the cloud network, and transmitting the at least one of the plurality of real-time seismic transverse wave feature prediction values to the plurality of small districts through the cloud network based on a pre-determined allocation.

16. The method according to claim 15, furthering comprising a step of:

continually monitoring the plurality of on-site earthquake early warning stations.

17. The method according to claim 15, wherein when the on-site earthquake early warning station in a first one of the large districts fails, the information platform is configured to select a respective real-time seismic transverse wave feature prediction value of a second one of the large districts near the first one of the large districts and transmit the respective real-time seismic transverse wave feature prediction values from the on-site earthquake early warning station in the second one of the large districts to the small districts located in the first one of the large districts through the cloud network.

18. The method according to claim 15, wherein each of the real-time seismic transverse wave feature prediction values includes a maximum surface acceleration value.

19. The method according to claim 15, wherein each of the real-time seismic transverse wave feature prediction values includes a maximum surface speed value.

20. The method according to claim 15, wherein each of the real-time seismic transverse wave feature prediction values includes an intensity level.

* * * * *